(12) United States Patent
Johnson et al.

(10) Patent No.: US 10,882,646 B2
(45) Date of Patent: *Jan. 5, 2021

(54) SPACECRAFT SYSTEMS AND METHODS

(71) Applicant: NanoRacks, LLC, Webster, TX (US)

(72) Inventors: Michael David Johnson, Tomball, TX (US); Mark David Rowley, Friendswood, TX (US); Michael Desmond Lewis, Kemah, TX (US); J. Brockton Howe, League City, TX (US)

(73) Assignee: NanoRacks, LLC, Webster, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,206

(22) Filed: Jan. 13, 2020

(65) Prior Publication Data

US 2020/0156810 A1 May 21, 2020

Related U.S. Application Data (63) Continuation of application No. 15/264,238, filed on Sep. 13, 2016, now Pat. No. 10,569,911.

(60) Provisional application No. 62/218,427, filed on Sep. 14, 2015, provisional application No. 62/217,883, filed on Sep. 13, 2015.

(51) Int. Cl.
  *B64G 1/60* (2006.01)
  *B64G 1/64* (2006.01)
  *B64G 1/12* (2006.01)

(52) U.S. Cl.
  CPC .............. *B64G 1/646* (2013.01); *B64G 1/12* (2013.01); *B64G 1/60* (2013.01)

(58) Field of Classification Search
  CPC ................................. B64G 1/641; B64G 1/646
  See application file for complete search history.

(56) References Cited

U.S. PATENT DOCUMENTS

| 7,207,525 B2 * | 4/2007 | Bischof .................... B25J 15/10 244/158.2 |
| 7,669,804 B2 | 3/2010 | Strack et al. |
| 9,033,280 B2 | 5/2015 | Bigelow |
| 9,878,806 B2 * | 1/2018 | Helmer .................... B64G 1/66 |

OTHER PUBLICATIONS

Fehse, Wigbert. "Automated Rendezvous and Docking of Spacecraft." Cambridge Aerospace Series. 1st Edition. (Year: 2003).
Callen, Phillip. "Robotic Transfer and Interfaces for External ISS Payloads." 3rd Annual ISS Research and Development Conference. Jun. 2014. (Year: 2014).
Mclaughlin, Richard, et al. "The Common Berthing Mechanism (CBM) for International Space Station." Society of Automotive Engineers. 2001. (Year: 2001).

* cited by examiner

*Primary Examiner* — Philip J Bonzell
*Assistant Examiner* — Michael B. Kreiner
(74) *Attorney, Agent, or Firm* — Bookoff McAndrews, PLLC (57) ABSTRACT

Embodiments provide a spacecraft airlock system. Embodiments provide a method and apparatus for attaching space exposed payloads to a space station.

20 Claims, 7 Drawing Sheets

SPACECRAFT SYSTEMS AND METHODS

CROSS-REFERENCE TO RELATED APPLICATIONS

This application is a continuation of and claims the benefit of priority to U.S. application Ser. No. 15/264,238, filed Sep. 13, 2016, which claims the benefit of priority to U.S. Provisional Patent Application 62/218,427, filed Sep. 14, 2015, and U.S. Provisional Patent Application No. 62/217,883, filed Sep. 13, 2015, all of which are hereby incorporated by reference in their entireties.

FIELD OF THE INVENTION

The present disclosure relates generally to a spacecraft airlock system configurable to utilize robotic operation as well as a system and apparatus for attaching space exposed payloads to a space station.

BACKGROUND OF THE INVENTION

Space station modules may be attached to each other utilizing various means. In particular, the International Space Station (ISS) utilizes Common Berthing Mechanisms (CBMs) consisting of a male (Active Common Berthing Mechanism or ACBM) and a female (Passive Common Berthing Mechanism or PCBM) portion that connect modules together and permit transfer of resources, cargo and crew between each module.

Payloads exposed to outer space (i.e. vacuum) conditions may be attached to a space station by a variety of means. In particular, the International Space Station utilizes Flight Releasable Attachment Mechanisms (FRAMs) consisting of a male (Active Flight Releasable Attachment Mechanism or AFRAM) and a female (Passive Flight Releasable Attachment Mechanism or PFRAM) portion that connects vacuum exposed payloads to the International Space Station and provides power, data line connectivity, and physical attachment of the vacuum exposed payload with the International Space Station.

In the case of the International Space Station, the FRAM sites are located far from the pressurized modules and have limited resources such as power and data lines and generally no thermal management system (e.g. active cooling loops) that are enjoyed by the pressurized modules.

BRIEF SUMMARY OF THE INVENTION

In embodiments, the disclosure may provide an improved spacecraft airlock system, and in particular, a system and method for attaching a single hatch airlock robotically to a spacecraft.

In embodiments, an airlock may comprise a plurality of CBM sites. In embodiments, the airlock may be lightweight and simple in construction. In embodiments, the airlock may be moved between CBM locations and other locations without the utilization of an astronaut Extravehicular Activity (EVA or spacewalk) by using robotic means.

In embodiments, the disclosure may provide a system for attaching space exposed payloads to a space station and in particular a method and apparatus for attaching FRAM sites to a module containing a CBM.

In embodiments, CBM sites may be utilized as FRAM sites. In embodiments, FRAM sites may take advantage of the superior resources that are available to a CBM site such as, but not limited to, increased power, thermal cooling, and higher bandwidth data services. In embodiments, the FRAM sites may be moved to another CBM location without the utilization of an astronaut Extravehicular Activity (EVA or spacewalk). In embodiments, any number of FRAM sites may be added to a CBM site without interfering with the operation of the CBM site.

BRIEF DESCRIPTION OF THE DRAWINGS

The novel features believed characteristic of the disclosed subject matter will be set forth in any claims that are filed now and/or later. The disclosed subject matter itself, however, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
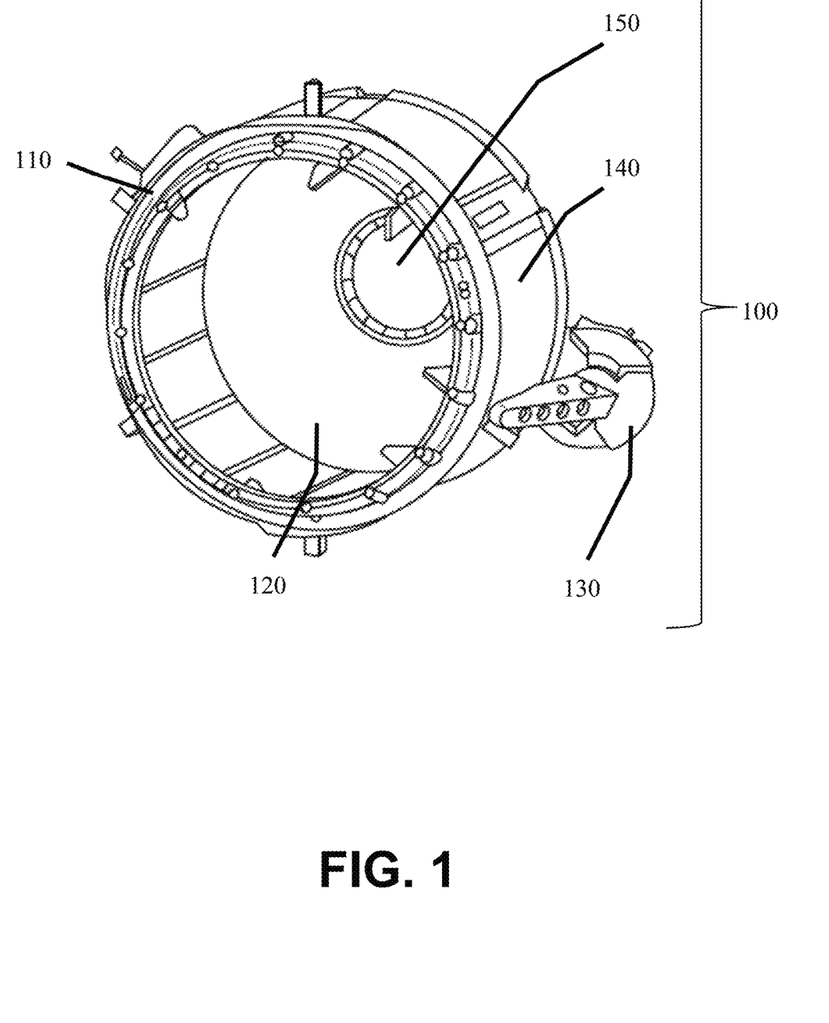
FIG. 1 displays a perspective view of an end module affixed to a robotic grapple fixture in accordance with embodiments.

FIG. 1 displays a perspective view of an end module 100 affixed to a robotic grapple fixture 130 in accordance with embodiments. The end module 100 may comprise a PCBM 110 positioned around an open end 120 that may affix to a space station, such as the ISS. The module 100 may further include a cylindrical sidewall 140 with at least one robotic grapple fixture 130 (such as, but not limited to a Power/Video Grapple Fixture/PVGF, Flight Releasable Grapple Fixture/FRGF, etc.) affixed to the cylindrical sidewall 140 that may permit robotic manipulation of the module 100. In embodiments, a hatch 150 may be affixed to an end of module 100 opposite the open end 120.

Figure 2:
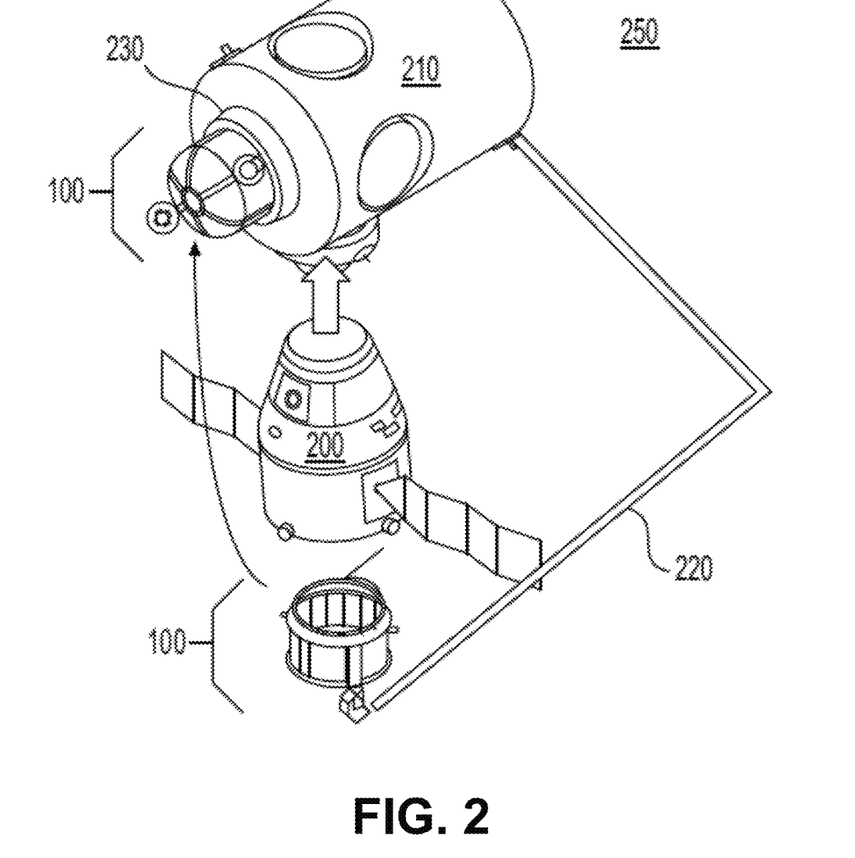
FIG. 2 displays a spacecraft airlock system in accordance with embodiments.

FIG. 2 displays a spacecraft airlock system 250 in accordance with embodiments. End module 100 may be transported to orbit via a transportation vehicle 200 travelling to a space station 210 (such as the SpaceX Dragon). The end module 100 may be affixed to transportation vehicle 200 via the PCBM 110. Once the transportation vehicle 200 has berthed at the space station 210, the robotic grapple fixture 130 affixed to the module 100 may be grappled to a robotic arm 220 affixed to the space station 210. The robotic arm 220 may remove the end module 100 from the transportation vehicle 200 and move the end module 100 to a desired ACBM site 230 so that the end module 100 may be berthed on the ACBM site 230 found on the space station 210. A crew within the space station 210 may then pressurize module 100, open a hatch affixed to ACBM site 230, and transfer crew members and/or equipment to and from module 100. The module 100 may then be utilized as an airlock.

Figure 3:
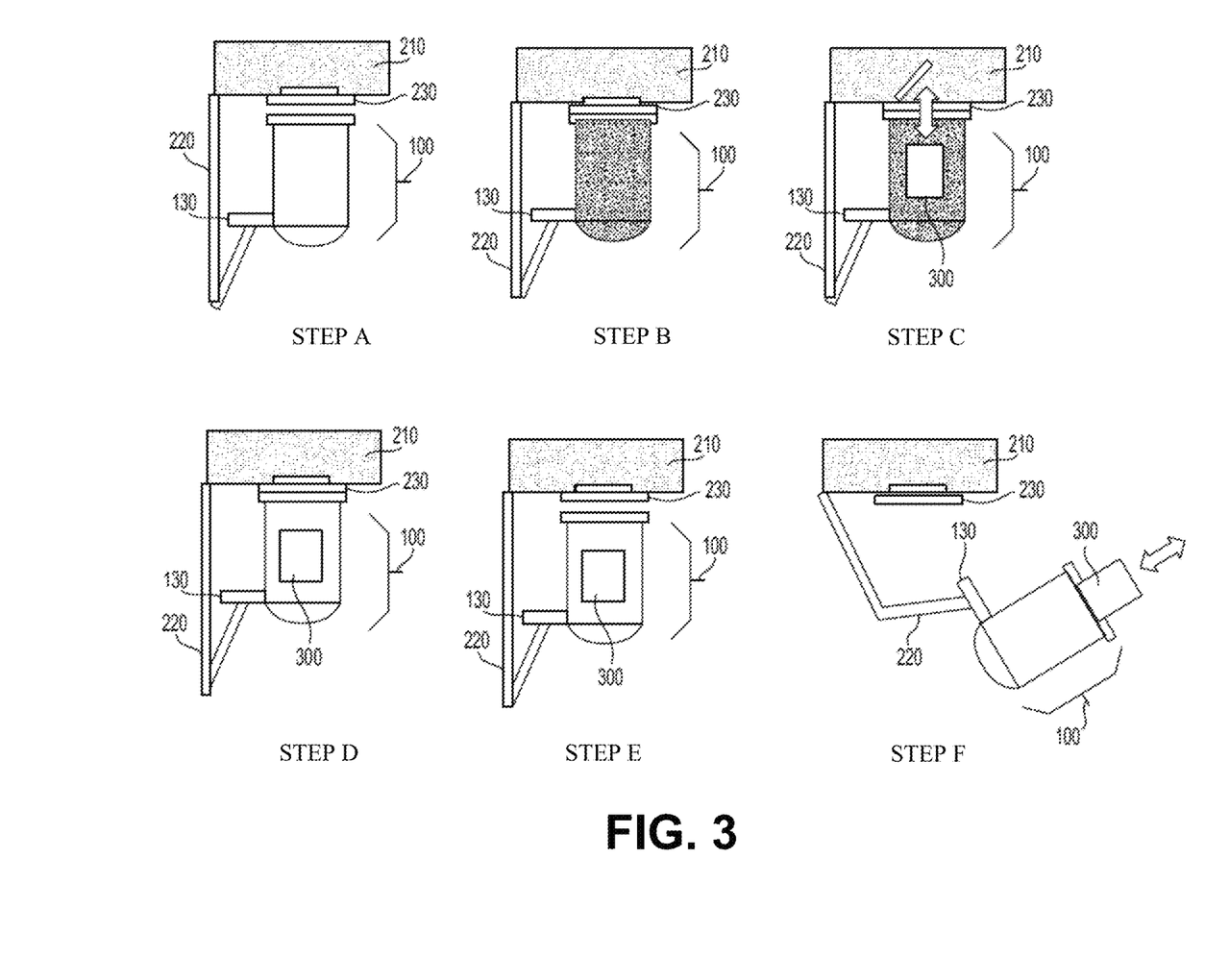
FIG. 3 displays a pictorial method for transporting crew/equipment from a space station in accordance with embodiments.

FIG. 3 displays a pictorial method 310 for transporting crew/equipment from a space station in accordance with embodiments. In depiction A, module 100 module 100 may be berthed on an ACBM site 230 on space station 210 using robotic arm 220. Depiction B shows module 100 being pressurized from air inside the space station 210. Depiction C shows equipment and or crew 300 being placed inside module 100. Depiction D shows an ACBM site 230 hatch being closed and module 100 being depressurized. Depiction E shows module 100 being removed from the ACBM site 230 on the space station 210 using robotic arm 220. Depiction F shows equipment and/or crew 300 being placed outside module 100. Additional equipment and/or crew 300 may then be placed inside module 100 for eventual transport into the space station 210. In embodiments, steps in method 310 may then be repeated after the placing of the equipment and/or crew 300.

Figure 4:
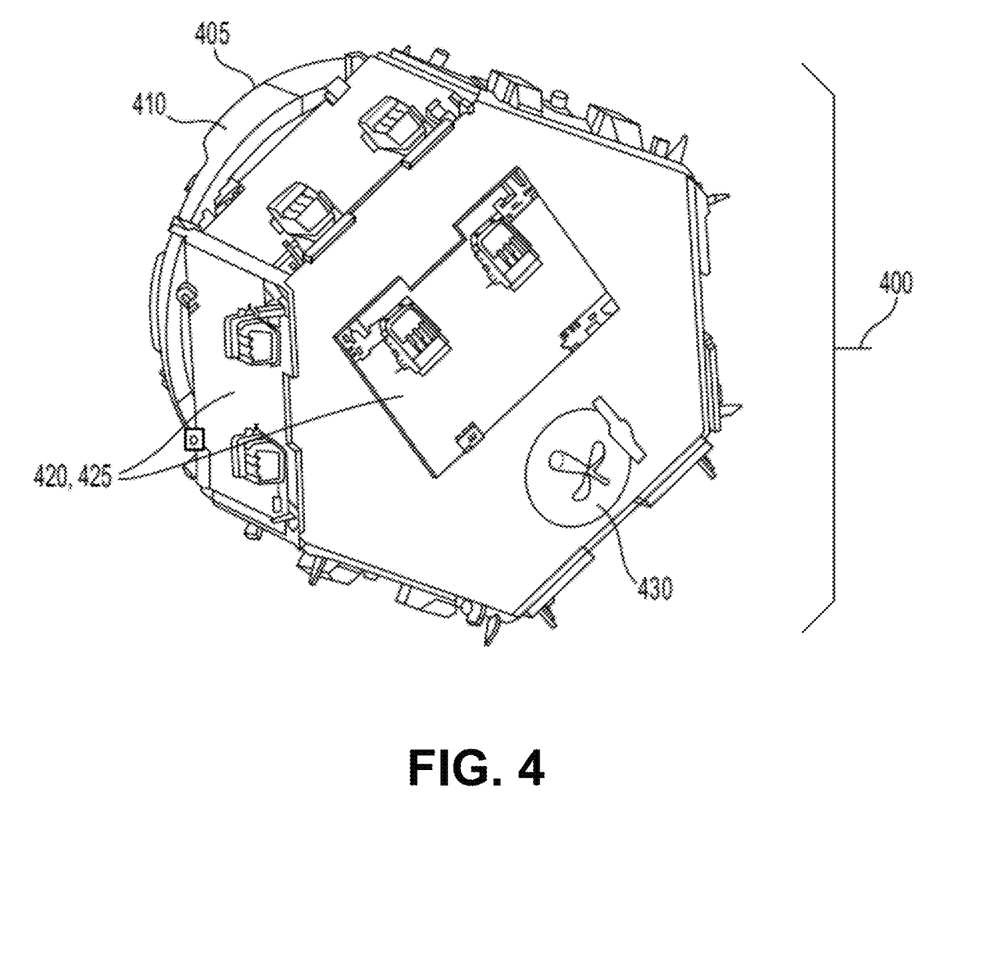
FIG. 4 displays a perspective view of a module with a closed end in accordance with embodiments.

FIG. 4 displays a perspective view of a module 400 with a closed end in accordance with embodiments. The closed end module 400 includes a PCBM 410 comprising an open end 405 that may attach to a space station 510. The module 400 may comprise a six-sided cylindrical body including six PFRAM sites 420 located on each face and a seventh PFRAM site 425 located on an end face 435 opposite the PCBM 410 of module 400. At least one robotic grapple fixture 430 (e.g. a Flight Releasable Grapple Fixture or FRGF) may be located on the end face 435 to permit robotic manipulation of module 400.

Figure 5:
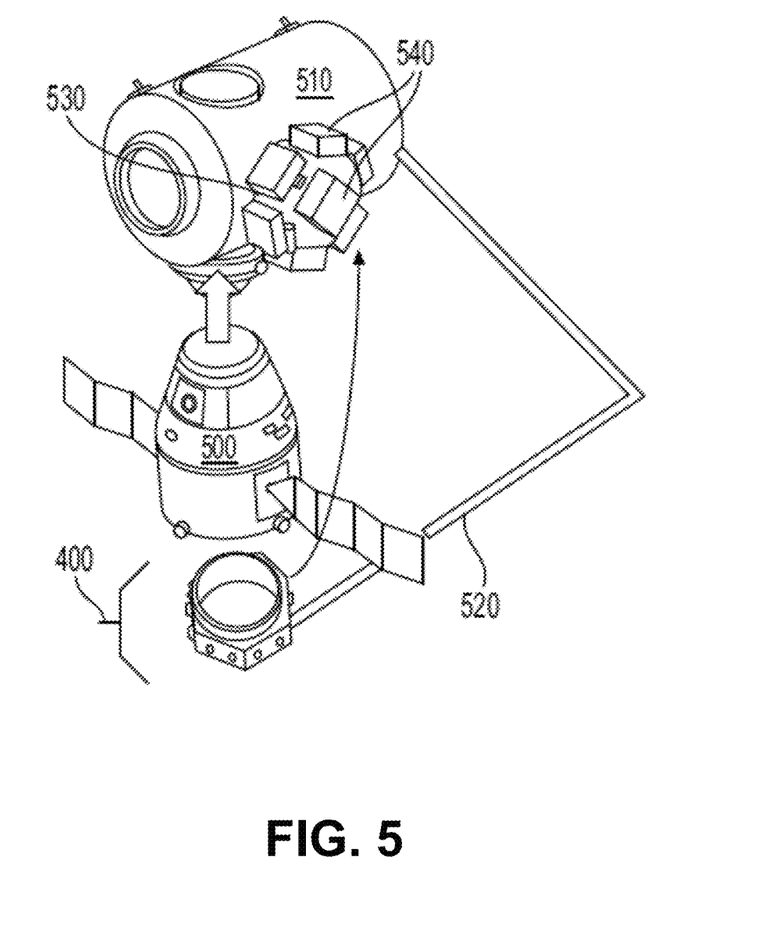
FIG. 5 displays a perspective view of the module being removed from a transportation vehicle and affixed to a space station in accordance with embodiments.

FIG. 5 displays a perspective view of the module 400 being removed from a transportation vehicle and affixed to a space station in accordance with embodiments. Module 400 may be transported to orbit via a space station visiting vehicle 500 (such as, but not limited to, SpaceX Dragon) and, once the visiting vehicle 500 has berthed at space station 510, module 400 may be grappled via robotic arm 520, removed from visiting vehicle 500, moved to the desired ACBM site 530, and berthed on the ACBM site 530 on space station 510. The space station crew may then open the hatch on the ACBM site 530 side and connect space station 210 utilities (e.g. electrical, data, coolant lines, etc.) to module 400. Module 400 may then be ready for use to mount AFRAM payloads 540 on module 400.

Figure 6:
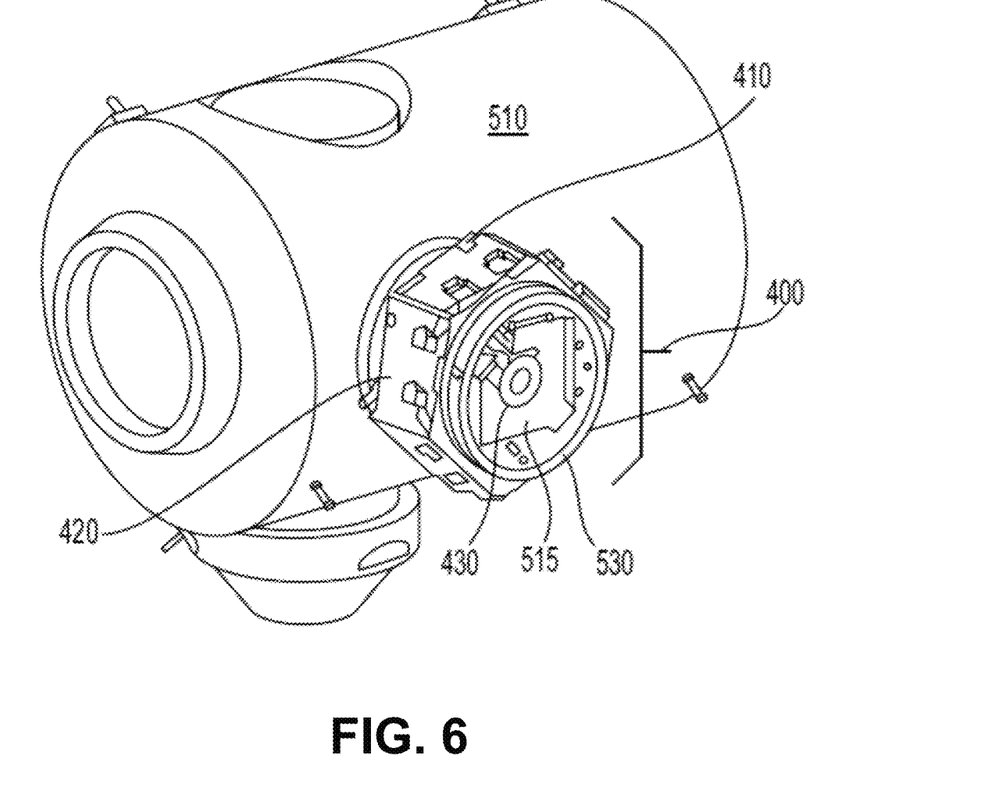
FIG. 6 displays a perspective view of a module with an ACBM end being affixed to a space station in accordance with embodiments.

FIG. 6 displays a perspective view of a module 400 with an ACBM end being affixed to a space station in accordance with embodiments. Module 400 may comprise an open end 405 (FIG. 4) with a PCBM 410 that may attach to the space station 510 and an ACBM site 530 (with temporary hatch) on a second open end 515. Module 400 may comprise a six-sided cylindrical body with six PFRAM sites 420 located on each face around the periphery of the module. At least one robotic grapple fixture 430 (e.g. a Flight Releasable Grapple Fixture or FRGF) may be located on the ACBM site 530 face to permit robotic manipulation of module 400. The module 400 may be transported to orbit in the same fashion as illustrated in FIG. 2.

Figure 7:
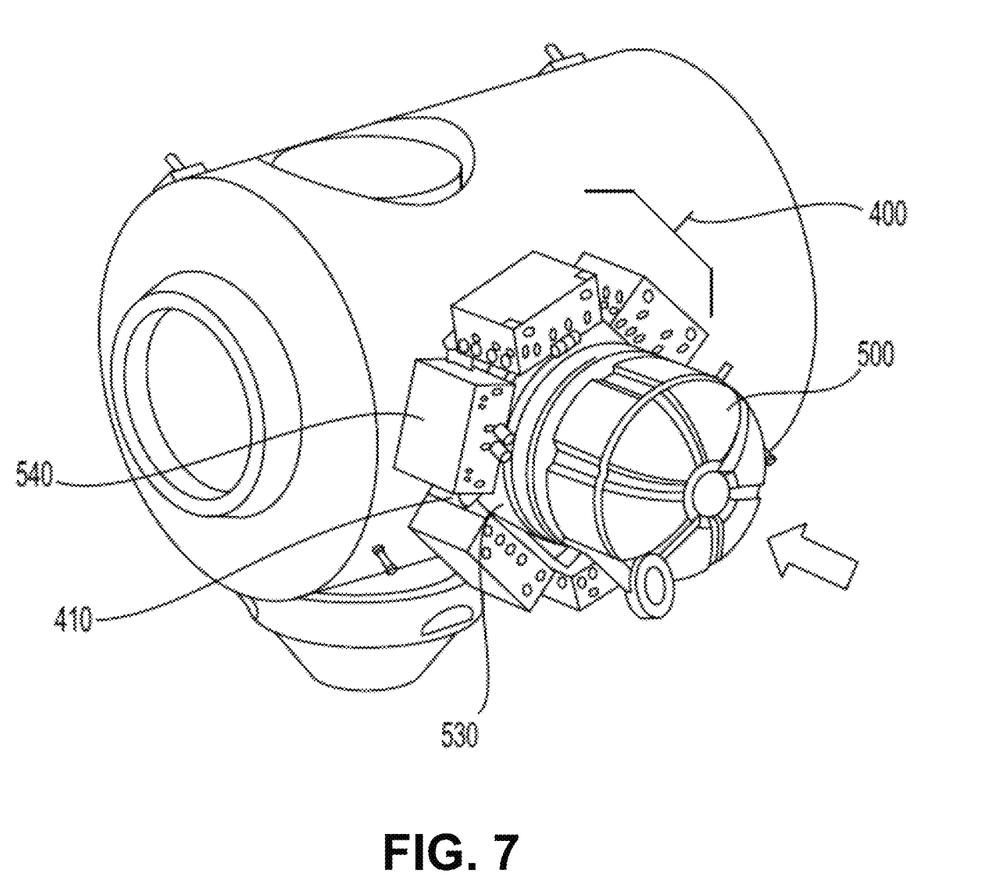
FIG. 7 displays a perspective view of a module including FRAM based payloads and affixed to a space station in accordance with embodiments.

FIG. 7 displays a perspective view of a module 400 including FRAM based payloads 540 and affixed to a space station 510 in accordance with embodiments. In embodiments, module 400 may be a PCBM 410/ACBM 530 version, wherein multiple modules 400 may be attached to each other without interfering with the continued operation of the CBM system. Other modules or visiting vehicles 200 may attach to the ACBM site 530 of the module stack at any time without interfering with the operation of the CBM system or FRAM based payload 540 installation or removal.

While this disclosure has been particularly shown and described with reference to preferred embodiments thereof and to the accompanying drawings, it will be understood by those skilled in the art that various changes in form and details may be made therein without departing from the spirit of this disclosure. Therefore, the scope of the disclosure is defined not by the detailed description but by the appended claims.

The invention claimed is:

1. A spacecraft enclosure, comprising:
    a berthing mechanism positioned around one end of the enclosure for selectively engaging the enclosure with a space station or with a transportation vehicle for transporting the enclosure proximate to the space station;
    a cylindrical sidewall adjoining the berthing mechanism of the enclosure;
    an endwall adjoining the cylindrical sidewall, opposite the berthing mechanism of the enclosure;
    an attachment mechanism positioned on the cylindrical sidewall or the endwall, and configured for releasably attaching vacuum exposed payloads to an exterior surface of the enclosure; and
    a grappling fixture positioned on the cylindrical sidewall or the endwall, and configured for engaging a robotic grappling arm of the space station for robotic manipulation of the enclosure, the grappling fixture being configured to engage the robotic grappling arm for disengaging the enclosure from the transportation vehicle in preparation for controllably positioning the enclosure on the space station.

2. The spacecraft enclosure of claim 1, wherein the grappling fixture comprises a grappling fixture from the group consisting of a power/video grappling fixture, a flight releasable grappling fixture, and similarly functioning grappling fixtures capable of robotic control from a robotic control circuitry.

3. The spacecraft enclosure of claim 1, wherein the enclosure is an airlock.

4. The spacecraft enclosure of claim 3, wherein the berthing mechanism of the enclosure engages the airlock with the space station at an active common berthing mechanism of the space station for receiving pressurized air from inside the space station.

5. The spacecraft enclosure of claim 3, wherein said airlock forms a pressurized volume accessible by crew.

6. The spacecraft enclosure of claim 3,
wherein said airlock forms a pressurized volume accessible by crew, said pressurized volume accessible through a single hatch.

7. The spacecraft enclosure of claim 3,
wherein said airlock forms a pressurized volume accessible by crew without the use of a hatch to perform the airlock function.

8. The spacecraft enclosure of claim 3,
wherein said enclosure permits operation of electrical, data, coolant, and other operational systems using the closable opening.

9. The spacecraft enclosure of claim 1,
wherein said robotic grappling arm operates responsive to direct control from an operator directing the engagement of the enclosure.

10. The spacecraft enclosure of claim 1, further comprising a closable opening on the surface of the endwall, wherein the closable opening permits access from the exterior of the enclosure to the interior of the enclosure.

11. A method for attaching an enclosure to a spacecraft, comprising the steps of:
engaging a berthing mechanism positioned around one end of the enclosure to a space station, the enclosure comprising a cylindrical sidewall adjoining the berthing mechanism and an endwall adjoining the cylindrical sidewall, opposite the berthing mechanism of the enclosure;
attaching vacuum exposed payloads to an exterior surface of the enclosure using an attachment mechanism, wherein the at least one attachment mechanism is positioned on the said cylindrical sidewall or said endwall;
engaging a robotic grappling arm to a grappling fixture positioned on the cylindrical sidewall or the endwall for robotic manipulation of the enclosure;
engaging the enclosure with a transportation vehicle for transporting the enclosure proximate to the space station; and
engaging the grappling fixture of the enclosure with the robotic grappling arm of the space station for disengaging the enclosure from the transportation vehicle in preparation for controllably positioning the enclosure on said space station.

12. The method of claim 11, further comprising the step of robotically controlling the grappling fixture as a grappling fixture from the group consisting of a power/video grappling fixture, a flight releasable grappling fixture, and similarly functioning grappling fixtures.

13. The method of claim 11, wherein the enclosure is an airlock.

14. The method of claim 13, further comprising the step of engaging via the berthing mechanism of the enclosure, the airlock with the space station at an active common berthing mechanism of the space station for receiving pressurized air from inside the space station.

15. The method of claim 14, further comprising the step of forming a pressurized volume accessible by crew using the airlock.

16. The method of claim 14, further comprising the step of accessing a pressurized volume formed by the airlock through a single hatch.

17. The method of claim 14, further comprising the step of accessing a pressurized volume formed by the airlock through a single hatch without the use of a hatch to perform the airlock function.

18. The method of claim 13, operating electrical, data, coolant, and other operational systems associated with the enclosure using the closable opening.

19. The method of claim 11, further comprising the step of operating the robotic grappling arm responsive to direct control from an operator directing the engagement of the enclosure.

20. The method of claim 11, further comprising a closable opening on the surface of the endwall, wherein the closable opening permits access from the exterior of the enclosure to the interior of the enclosure.

* * * * *